United States Patent
Daniel et al.

(10) Patent No.: US 9,503,159 B2
(45) Date of Patent: Nov. 22, 2016

(54) STORING AND RETRIEVING ELECTRONIC DEVICE INFORMATION

(71) Applicant: CELLCO PARTNERSHIP, Basking Ridge, NJ (US)

(72) Inventors: Tom Daniel, Monmouth Junction, NJ (US); Yuk Lun Li, Morganville, NJ (US); Nanjun Qian, Princeton, NJ (US); Manuel E. Caceres, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 775 days.

(21) Appl. No.: 13/875,115

(22) Filed: May 1, 2013

(65) Prior Publication Data

US 2014/0327523 A1 Nov. 6, 2014

(51) Int. Cl.
*H04Q 5/22* (2006.01)
*H04B 5/00* (2006.01)
*H04B 5/02* (2006.01)

(52) U.S. Cl.
CPC .......... *H04B 5/0056* (2013.01); *H04B 5/0037* (2013.01); *H04B 5/0031* (2013.01); *H04B 5/0062* (2013.01); *H04B 5/02* (2013.01)

(58) Field of Classification Search
None
See application file for complete search history.

(56) References Cited

U.S. PATENT DOCUMENTS

| | | | | |
|---|---|---|---|---|
| 6,567,004 B1* | 5/2003 | Landa | .................. | G08B 21/088 340/568.1 |
| 8,532,295 B2* | 9/2013 | Benteo | .................. | H04L 9/0869 380/255 |
| 9,209,866 B2 | 12/2015 | Ingels | | |
| 2008/0121687 A1 | 5/2008 | Buhot | | |
| 2009/0023476 A1* | 1/2009 | Saarisalo | ........... | G06K 7/10237 455/561 |
| 2010/0037322 A1* | 2/2010 | Blanchet | ................. | G06F 21/52 726/26 |
| 2010/0178868 A1* | 7/2010 | Charrat | .............. | G06Q 20/3278 455/41.1 |
| 2010/0210300 A1* | 8/2010 | Rizzo | ................... | G06K 7/0008 455/552.1 |
| 2011/0170456 A1* | 7/2011 | Marseille | .......... | H04M 1/72519 370/277 |
| 2012/0178366 A1* | 7/2012 | Levy | ................... | G06K 7/10237 455/41.1 |
| 2012/0297204 A1 | 11/2012 | Buer | | |
| 2012/0315843 A1* | 12/2012 | Cox | ......................... | H04B 5/00 455/41.1 |
| 2012/0315972 A1* | 12/2012 | Olson | ..................... | A63F 13/02 463/17 |
| 2012/0317628 A1* | 12/2012 | Yeager | ................. | G06Q 20/204 726/5 |
| 2013/0040566 A1* | 2/2013 | Mourtel | .............. | G06K 7/0008 455/41.1 |
| 2013/0059568 A1* | 3/2013 | Huque | ................ | H04L 63/0492 455/411 |
| 2013/0124349 A1 | 5/2013 | Khan et al. | | |

(Continued)

*Primary Examiner* — Curtis King (57) ABSTRACT

An electronic device includes a processor, a memory, an embedded element storing information, and a short-range radio controller. The embedded element is readable by an external reader. The short-range radio controller is configured to receive a radio communication. If the short-range radio controller is being powered by a primary battery that powers the processor, the short-range radio controller is configured to route the radio communication to the embedded element if the radio communication is for accessing the embedded element, or route the radio communication to a component of the electronic device different from the embedded element if the radio communication is not for accessing the embedded element. If the short-range radio controller is not being powered by the primary battery, the short-range radio controller is configured to route the radio communication to the embedded element.

19 Claims, 4 Drawing Sheets

(56) References Cited

U.S. PATENT DOCUMENTS

| | | | | |
|---|---|---|---|---|
| 2013/0331029 A1* | 12/2013 | Tang | .................... | H04W 4/003 455/41.1 |
| 2014/0057559 A1* | 2/2014 | Smith | .................. | H04B 5/0037 455/41.1 |
| 2014/0058953 A1* | 2/2014 | Florek | ................... | G06Q 20/20 705/71 |
| 2014/0218177 A1* | 8/2014 | Zhao | .................. | G06K 19/0723 340/10.5 |
| 2014/0256251 A1* | 9/2014 | Caceres | ............... | H04B 5/0031 455/41.1 |
| 2014/0370804 A1* | 12/2014 | Dorning | ............... | H04B 5/0031 455/41.1 |
| 2015/0089586 A1* | 3/2015 | Ballesteros | ........... | H04W 12/08 726/3 |

* cited by examiner

STORING AND RETRIEVING ELECTRONIC DEVICE INFORMATION

BACKGROUND

Traditionally, in some electronic devices, a device identifier (e.g., a unique serial number assigned to an electronic device) was placed on a tag in a battery compartment of the electronic device. The battery compartment could also include a sticker that indicated (e.g., by changing its color) that the device was water damaged. The device identifier and the water damage information are important in troubleshooting an electronic device (e.g., when a customer attempts to return the electronic device or request repairs) and determining whether the electronic device is covered by the manufacturer's or service provider's warranty. In some cases, the electronic device may not be capable of being powered on when the electronic device is in need of troubleshooting.

Many electronic devices (e.g., smartphones or tablet computers) on the market today do not have battery compartments that can be opened easily, and opening the battery compartment can, in some cases, void the manufacturer's warranty on the electronic device. As a result, the device identifier and water damage information can be placed on a back or side cover of the electronic device. However, this solution is not typically implemented as the device identifier and the water damage information are not aesthetically pleasing and the device identifier and water damage information would have to be resistant to wear and tear to which portable electronic devices are typically exposed (e.g., scratching by keys, dropping on pavement, etc.). Another solution is to store the device identifier and water damage information in the software memory of the electronic device. However, in some cases, the electronic device may not be capable of being powered on when the electronic device is malfunctioning and in need of troubleshooting. In these cases, the information stored in the software memory may not be useful. As the foregoing illustrates, a new approach for storing device identification and water damage information may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various techniques and approaches disclosed herein relate to storing and retrieving electronic device information. For example, identification information (e.g., a serial number) or water damage information of the mobile device.

Figure 1:
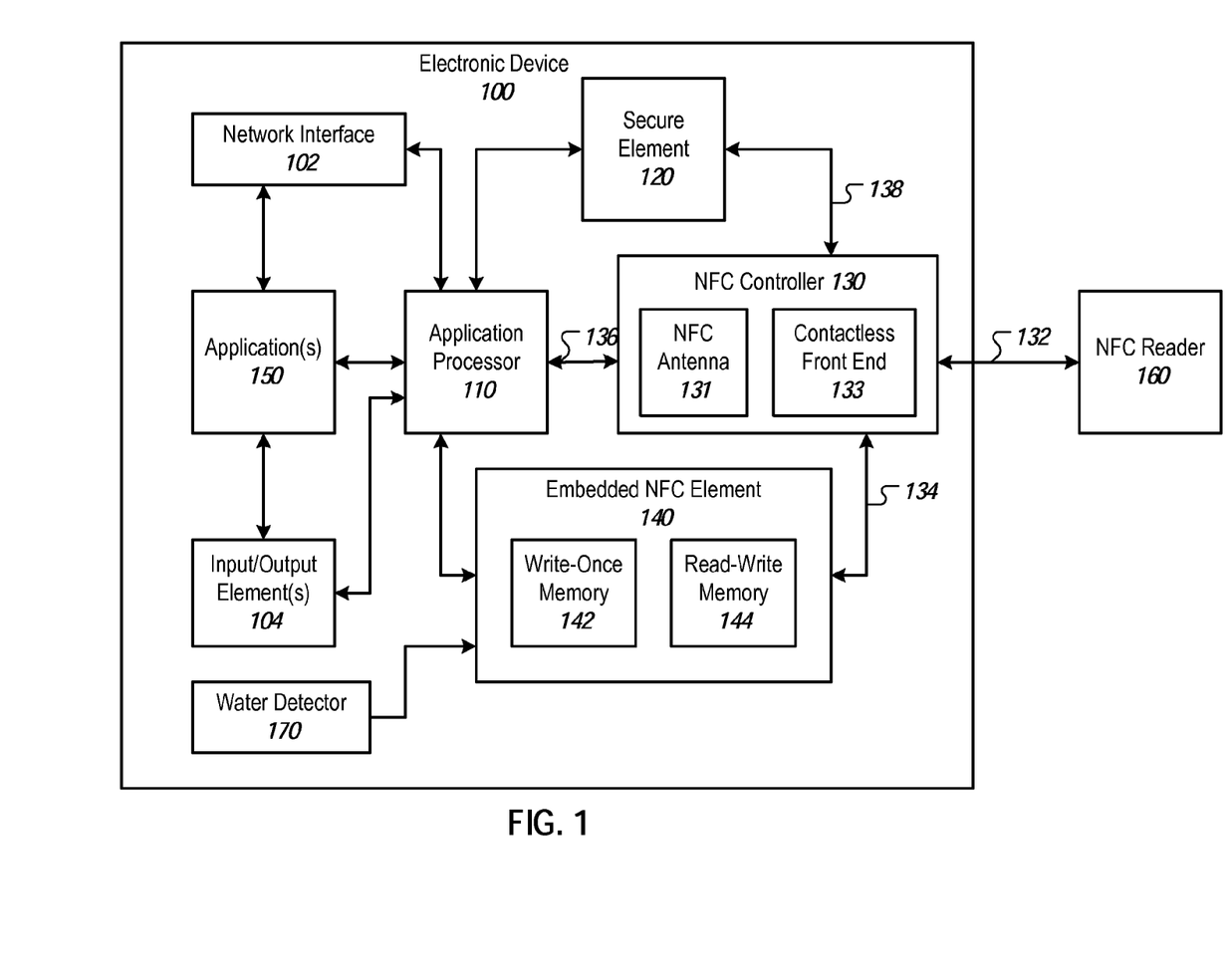
FIG. 1 is a data flow diagram of an example electronic device configured to store and retrieve information.

The subject technology, in some implementations, is directed to storing information about an electronic device in a form that is accessible when the electronic device is powered off. Examples of information that can be stored include a device identifier, a battery identifier, device certification information, device quality information, or device usage history information (e.g., whether the device was exposed to water or extreme temperatures). Reference now is made in detail to the examples illustrated in the accompanying drawings and discussed below. FIG. 1 is a data flow diagram of an example electronic device 100 configured to store and retrieve information. The electronic device 100 can correspond to any electronic device, for example, a laptop computer, a desktop computer, a mobile phone, a tablet computer, a personal digital assistant (PDA), a digital music player, a television with one or more processors embedded therein or coupled thereto, etc. The electronic device 100 can be a mobile device.

As shown, the electronic device 100 includes a network interface 102, input/output element(s) 104, an application processor 110, a secure element 120, a near field communication (NFC) controller 130, an embedded NFC element 140, application(s) 150, and a water detector 170. The electronic device 100 is configured to communicate with a NFC reader 160 external to the electronic device 100.

The network interface 102 is configured to allow the electronic device to transmit and receive data via one or more networks, for example, the Internet, a wired network, a wireless network, a local area network (LAN), a wide area network (WAN), a cellular network, a WiFi network, etc. The network interface 102 may include one or more network interface cards (NICs). In some examples, the network interface 102 includes a wireless transceiver configured to enable wireless data communication via the one or more networks.

The input/output element(s) 104 are configured to allow a user of the electronic device 100 to interface with the electronic device 100. The input/output element(s) may include one or more of a keyboard, a mouse, a touch screen, a non-touch display device, a telephone dial pad, a television remote control, etc. The input/output element(s) 104 can be internal to the electronic device 100 (e.g., a touch screen can be a component of a mobile phone) or external to the electronic device 100 (e.g., a laptop computer can be connected to an external mouse via a universal serial bus (USB) port or a Bluetooth® radio connection).

The application processor 110 is configured to control operation of the electronic device 100 or to execute application(s) 150 stored at the electronic device 100. While a single application processor 110 is illustrated, the application processor 110 can be replaced with some other processing hardware, for example, one or more of a central processing unit (CPU) including one or multiple processors, a graphics processing unit (GPU) including one or multiple processors, a video processing unit including one or multiple processors, or any other processing unit(s). The application processor 110 can be a host processor.

The application(s) 150 include applications stored in a memory of the electronic device 100. The application(s) 150 can include any software application(s), for example, a web browser, a word processing application, a mobile payment application, a NFC code reader application for viewing webpage(s) or other information associated with a NFC code, etc. The application(s) 150 can include mobile phone, digital music player, or tablet computer application(s). The application(s) 150 can be stored in a memory of the electronic device 100. The memory can correspond to a cache unit, a storage unit, a long-term memory, a short-term memory, etc.

The embedded NFC element 140 stores the information that is accessible when the electronic device 100 is powered off. The embedded NFC element 140 may require relatively little power (e.g., a passive tag that is able to draw enough radiated power from a remote source) and/or may have its own power source independent of the primary battery of the electronic device 100. The embedded NFC element 140 can be implemented as any short-range radio communication tag or embedded short-range radio communication element. In some examples, the embedded NFC element 140 is implemented as a secure element or as a component of the secure element 120. However, if the embedded NFC element 140 is a secure element or a part of a secure element, the embedded NFC element 140 can be powered through a NFC chip or a dedicated NFC battery, rather than the default power source (e.g., primary battery) for the electronic device 100. Alternatively, as illustrated in FIG. 1, the embedded NFC element 140 can be separate and distinct from the secure element 120.

As used herein, the phrase "embedded NFC element" encompasses its plain and ordinary meaning including, but not limited to, an element embedded in an electronic device that is configured to store information about the electronic device that is readable by an external NFC reader. As used herein, the phrase "embedded element" encompasses its plain and ordinary meaning including, but not limited to, an element embedded in an electronic device that is configured to store information about the electronic device that is readable by an external reader. The external reader can be an external short-range radio reader, for example an external NFC reader, or any other reader. As used herein, the phrase "short-range radio," includes any radio for communication at distances below a threshold distance. The threshold distance can be, for example, 5 meters, 1 meter, 10 centimeters, 5 centimeters, 2 centimeters, 1 centimeter, 5 millimeters, etc.

In some examples, the embedded NFC element 140 includes write-once memory 142 and read-write memory 144. The write-once memory 142 can store, for example, a device identification number for the electronic device 100, a battery identification number for the primary battery of the electronic device 100, or an identification of network or radio access capabilities (e.g., WiFi, Bluetooth®, 3G, etc.) of the electronic device 100. The read-write memory 144 can include a usage log of the electronic device 100 so that a reason for failure of the electronic device 100 can be determined in the event of a failure.

According to some implementations, the embedded NFC element 140 includes a water damage indicator. The water damage indicator can be in the write-once memory 142. The water damage indicator could initially be set to 0, FALSE, or BLANK, and permanently reset to 1, TRUE, or NON-BLANK in an event that a water detector 170 in the electronic device 100 detects water at a specified physical position in the electronic device 100 (e.g., the first time the water sensor detects water). In some implementations, the only item that is written in the write-once memory 142, in an event that water is detected by the water detector 170, is the water damage indicator. The water damage indicator may be only written a single time when the water detector 170 detects water in the specified physical position in the electronic device 100. The water detector 170 can be configured to detect a presence of water in a position in the electronic device 100, for example, adjacent to the primary battery of the electronic device 100 in the primary battery compartment. The water detector 170 can be connected to the water damage indicator and configured to write to the water damage indicator using any logic or electronic circuitry, for example a wire. In some examples, if the network interface 102 and the application processor 110 are still functioning after the water detector 170 detects the water at the specified physical location, the network interface 102 can transmit, via the network, an indication that the electronic device 100 is water damaged, for example, to the manufacturer or the service provider for the electronic device 100. In response, the manufacturer or service provider can void the warranty on the electronic device 100 or refuse to allow repairs of the electronic device 100 under the warranty. In some implementations, if the network interface 102 is not functioning or not connected to a network, the indication of water damage may be stored in the water damage indicator and not transmitted to the manufacturer or service provider. However, using the techniques described herein, the manufacturer or service provider may use a short-range radio reader (e.g., a NFC reader) to determine that the water damage indicator indicates water damage to the electronic device 100. In some examples, the electronic device 100 can have multiple water detectors 170 at different positions of the electronic device 100, and different information can be stored locally at the electronic device 100 and/or transmitted via the network to the manufacturer or the service provider based on which of the multiple water detectors detect water.

According to some examples, the electronic device 100 operates according to a sequence upon detecting water by the water detector 170. First, the electronic device 100 may attempt to transmit the indication of water damage over the network, and then the electronic device 100 may store the indication of water damage locally. The electronic device 100 may store the indication of water damage locally at the electronic device 100 if the transmission over the network of the indication of water damage is unsuccessful, for example.

In some examples, the information transmitted over the network to indicate water damage includes a device identifier (e.g., an International Mobile Station Equipment Identity (IMEI) number) of the electronic device. The information transmitted over the network to indicate water damage can also include the content of the water damage indicator of the electronic device 100 and/or information about user activity (e.g., running software programs) on the electronic device 100 at the time the water detector 170 detected the water to guard against inadvertent transmission of the indication of the water damage.

In some examples, different message(s) (e.g., message(s) containing different information or message(s) directed to different destination(s)) can be transmitted over the network depending on the severity of the water damage. For example, when water is detected by the water detector 170, a first message can be transmitted over the network and a diagnostic test can be conducted on the electronic device 100. A second message can be transmitted over the network based on the result of the diagnostic test and/or information regarding the result of the diagnostic test can be stored locally at the electronic device 100. The severity of the water damage can be determined by the water detector 170, for example, based on an amount of water or water vapor present at the water detector. In some examples, the severity of the water damage can be determined based on an amount of pressure to which the mobile device is exposed, as measured for example, by a pressure meter within the water detector, as pressure increases when a device is submerged in water.

Upon learning of water damage to the electronic device 100, the manufacturer or service provider can void the warranty on the electronic device 100 or refuse to allow repairs of the electronic device 100 under the warranty. However, in some cases, the warranty void may be reversed. For example, if a network transmission indicates that the electronic device 100 is water damaged on Jan. 1, 2012, and the electronic device 100 is brought to the manufacturer or service providers for warranty repairs on an unrelated issue on Jul. 1, 2012, the warranty on the electronic device 100 can be reinstated as the unrelated issue occurring on Jul. 1, 2012, is not likely to have been caused by the water damage event of Jan. 1, 2012.

According to some implementations, the embedded NFC element 140 can store one or more of the following data items:

Device Specific Identification Information such as, for example, International Mobile Station Equipment Identity (IMEI), Stock-keeping unit (SKU), S/N Serial Number, P/N Part Number, Federal Communications Commission Identifier (FCC ID), Manufacture Location, Device Model number, Hardware version number, Software version number, Device radio frequency (RF) technology/capability information, Device chipset information (application/modem processor), and/or Device WIFI/Bluetooth® media access control (MAC) address;

Battery Specific Information such as, for example, Battery Cell model number, Battery Pack model number, Battery Cell Manufacture and location, Battery Pack Manufacture and location, Battery Pack Serial Number, Battery Nominal Voltage, Battery Typical Capacity, Battery Minimal Capacity, and/or Battery Chemistry information and Recycle Method;

Device Certification Information (e.g., certification icons typically on a label) such as, for example, Conformité Européenne (CE), Underwriters Laboratories® (UL), WIFI, Bluetooth® (BT), and/or Global Certification Forum® (GCF); and/or Device Quality Information such as, for example, Device Panic/Failure statistic information, Device Over Temperature Statistic information, Device Network Signal Statistic information, Liquid Damage information (LDI), Device Energy Usage information, and/or Battery Cycle Life information.

The NFC controller 130 can include or be coupled with a NFC antenna 131 for transmitting and/or receiving NFC communication(s). The NFC antenna 131 operates via a contactless front end 133 that handles communications between the NFC controller and NFC reader(s) external to the electronic device 100. As shown, the NFC controller 130 links to connections 132, 134, 136, and 138. Connection 132 links the NFC controller 130 to the external NFC reader 160. Connection 134 links the NFC controller 130 to the embedded NFC element 140. Connection 136 links the NFC controller 130 to the application processor 110. Connection 138 links the NFC controller 130 to the secure element 120.

The NFC controller 130 is configured to route NFC communications through the internal connections 134, 136, or 138 according to a technology being used. For example, if the electronic device 100 is being used to implement a security function, for example, to process a payment (e.g., to a merchant who may require credit card information to process the payment) via a payment terminal, the NFC controller 130 may route the NFC communications to the secure element 120 via the connection 138. If the electronic device 100 is being used to access an application that does not require a security function, for example, an application for viewing a publically accessible webpage associated with a passive NFC tag external to the electronic device 100, the NFC controller 130 may route the NFC communications to the application processor 110 via the connection 136. If the NFC controller 130 is communicating with a specialized NFC reader 160 for reading embedded NFC element 140 data, the NFC controller may route the communication to the embedded NFC element 140 via the connection 134. The type of application (e.g., security, no security, or specialized NFC reader) can be specified within a message transmitted to or from the electronic device 100 using the NFC controller 130), for example, within a header or a payload of the transmitted message.

In some examples, the NFC controller 130 includes logic to become transparent upon detecting the NFC reader 160 or upon losing power from a primary battery of the electronic device 100 (e.g., when the electronic device 100 is powered off or unable to power on due to damage). As a result, when the electronic device 100 lacks power from its primary battery or is powered off, the NFC reader 160 can still access the embedded NFC element 140 through the NFC controller 130 and the complex operations of the NFC controller (e.g., determining whether to route a communication to the secure element 120, the application processor 110, or the embedded NFC element 120) are not required. After the NFC controller 130 becomes transparent, the NFC reader 160 can read and process data from the embedded NFC element 140. In other words, after the NFC controller 130 becomes transparent, all NFC communications from any external NFC reader 160 are routed, via the connection 132 and the connection 134, to the embedded NFC element 140. In some examples, the embedded NFC element 140 includes authenticated or encrypted data that in one implementation can only be decrypted by the specialized NFC reader 160. The specialized NFC reader may be a NFC reader of a service provider located at a store of the service provider for use by employees of the service provider. As a result, the privacy of the user of the electronic device 100 is protected and data stored in the embedded NFC element 140 is only accessible to authorized people having access to the NFC reader 160 (e.g., technicians who service the electronic device 100 and/or are employees of the manufacturer or service provider of the electronic device 100). In other words, only authorized people can read information stored in the write-once memory 142 and/or the read-write memory 144 of the embedded NFC element 140.

In some examples, if the electronic device 100 is powered on and has access to a network, information stored in the memory unit(s) 142 and 144 of the embedded NFC element 140 can be transmitted to the manufacturer or the service provider of the electronic device 100 via the network, allowing the manufacturer or the service provider to have the information accessible to themselves if the user telephones the manufacturer or service provider to remotely troubleshoot the electronic device 100.

In some examples, the NFC controller 130 has a wired connection to the embedded NFC reader 140 or the NFC controller 130 and the embedded NFC reader 140 reside on the same circuit board. In some examples, the embedded NFC reader 140 includes its own antenna and is wirelessly connected to the NFC controller 130.

The NFC reader 160 resides externally to the electronic device 100 and communicates with the electronic device via NFC. The NFC reader 160 may have a cryptographic key and may authenticate the NFC controller 130 or the embedded NFC element 140 using the cryptographic key. Alternatively, any other authentication technique can be used. The NFC reader 160 provides a command to the NFC controller 130 informing the NFC controller 130 that communication from the NFC reader 160 should be routed directly to the embedded NFC element 140, rather than to the secure element 120 or the application processor 110.

The subject technology is described above as being implemented with NFC radio technology. However, the subject technology may be implemented with any other short-range radio communication technology in place of NFC. For example, in some cases, NFC radio technology can be replaced with one or more of: Bluetooth® radio technology, radio frequency identifier (RFID) technology, WiFi technology, microwave technology, etc.

Figure 2:
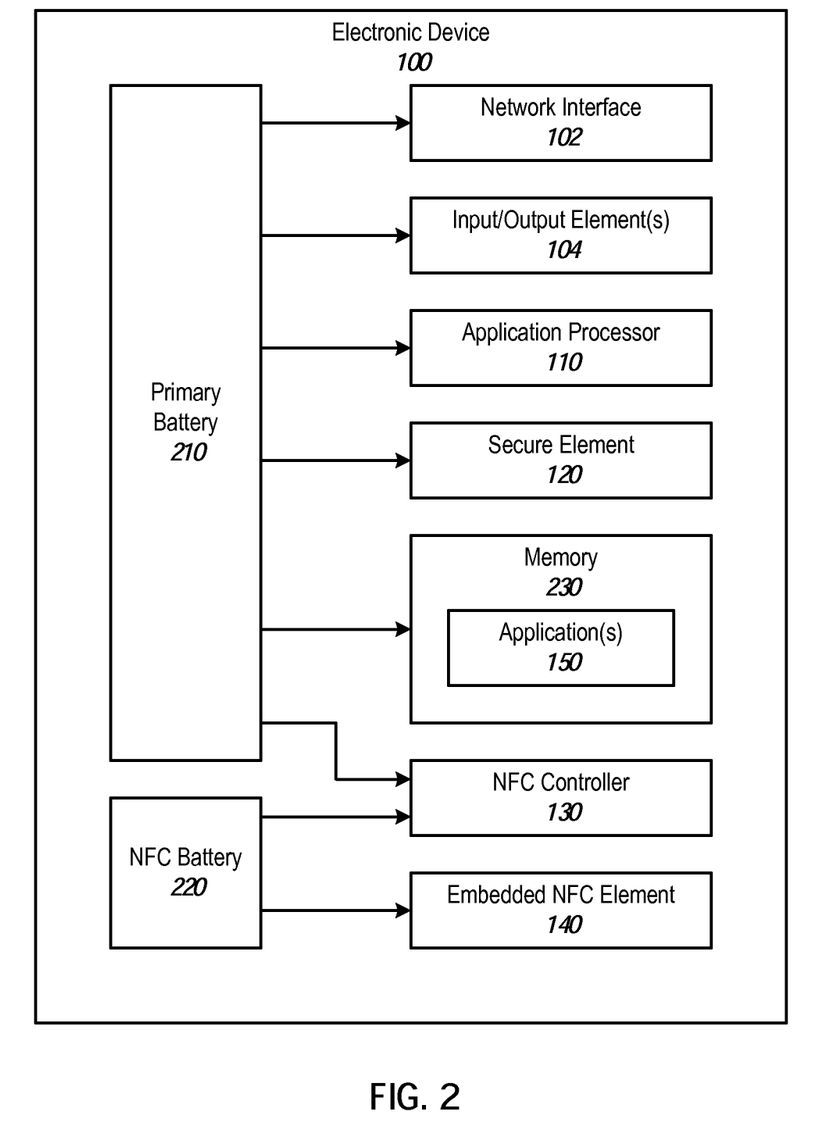
FIG. 2 is an electric power flow diagram of the example electronic device configured to store and retrieve information.

FIG. 2 is an electric power flow diagram of the example electronic device 100 configured to store and retrieve information. As shown, the electronic device 100 includes the network interface 102, the input/output element(s) 104, the application processor 110, the secure element 120, the NFC controller 130, and the embedded NFC element 140 described in conjunction with FIG. 1. The application(s) 150 reside within a memory 230. The memory 230 can include one or more of a cache unit, a storage unit, an internal memory, an external memory, a long-term memory, or a short-term memory. The electronic device 100 also includes a primary battery 210 and a NFC battery 220.

The primary battery 210 can correspond to a battery primarily responsible for powering the electronic device 100, for example, when the electronic device 100 is in an "on" state. The primary battery 210 can reside in a battery compartment of the electronic device 100, for example, at the bottom of a laptop computer or at the back of a mobile phone or tablet computer. In some implementations, for instance, in a desktop computer, the primary battery 210 may be replaced with a primary power source that plugs into a wall power outlet. As shown in FIG. 2, the primary battery 210 powers the network interface 102, the input/output element(s) 104, the application processor 110, the secure element 120, the memory 230, and the NFC controller 130.

The NFC battery 220 can reside on a NFC chip or in another location. In some examples, the NFC chip can also include the NFC controller 130 and/or the embedded NFC element 140. The NFC battery 220 can be smaller than the primary battery 210, but can have a longer battery life, as the NFC battery 220 may, in some examples, provide a relatively small amount of power to the embedded NFC element 140 and the NFC controller 130. In some implementations, the NFC battery 220 can be replaced with other batteries. The NFC battery 220 can be more damage-resistant than the primary battery 210. For example, the NFC battery 220 may be water-resistant or able to withstand extreme temperature conditions. In some examples, the NFC battery 220 is protected by a shield that insulates the NFC battery from water or extreme temperature conditions. In some examples, the NFC battery 220 is built into the NFC chip and is not removable from the electronic device 100. In some examples, the NFC battery is removable from the electronic device 100.

As shown, the NFC controller 130 is powered by both the primary battery 210 and the NFC battery 220. When the electronic device 100 is turned "on," the NFC controller 130 can be powered by the primary battery 210 and function to transmit NFC communication(s) from the NFC reader 160 to any of the secure element 120, the application processor 110, or the embedded NFC element 140 depending on the type of NFC communication(s) from the NFC reader 160. In some examples, the NFC controller 130 is wired to receive power from both the primary battery 210 and the NFC battery 220. The NFC controller includes logic to determine whether the primary battery 210 is providing power. If so, the NFC controller includes logic to receive power from the primary battery 210. If not, the NFC controller includes logic to receive power from the NFC battery 220.

However, when the electronic device 100 is turned "off," or the primary battery 210 is disabled, e.g., due to damage of the primary battery 210, the NFC controller 130 is powered by the NFC battery 220 and not by the primary battery 210. When the NFC controller 130 is being powered by the NFC battery 220 and not by the primary battery 210, the NFC controller 130 can function as a pass-through device that routes all NFC communication(s) received (e.g., from the NFC reader 160) at the NFC controller 130 to the embedded NFC element 140, which is also powered by the NFC battery 220. When powered by the NFC battery 220 and not by the primary battery 210, the NFC controller 130 may require less power as the NFC controller 130 is functioning as a pass-through device and does not need to implement logic to route communication(s) based on the type of communication(s). In some examples, the NFC controller 130 includes logic that determines the battery source (e.g., the primary battery 210 or the NFC battery 220) and changes the functionality of the NFC controller 130 accordingly, as set forth above.

Figure 3:
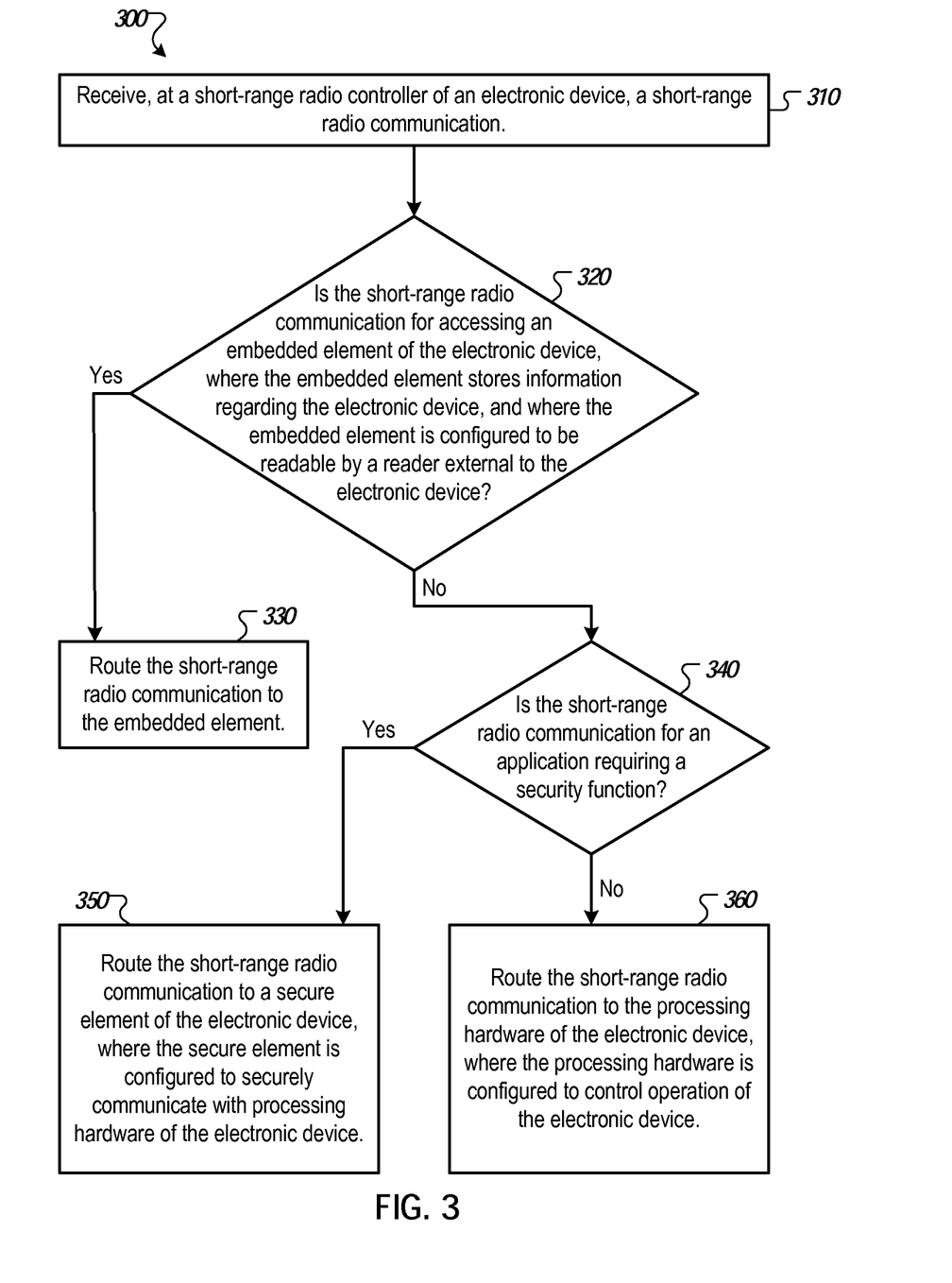
FIG. 3 is a flow chart of an example process for routing short-range radio communications in an electronic device.

FIG. 3 is a flow chart of an example process 300 for routing short-range radio communications in an electronic device. The process 300 begins at step 310, where a short-range radio controller of the electronic device (e.g., electronic device 100) receives a short-range radio communication. The short-range radio controller may include the NFC controller 130 or a controller for a short-range radio implementing another technology, for example, Bluetooth® radio technology, radio frequency identifier (RFID) technology, WiFi technology, microwave technology. The short-range radio communication may include NFC communication from the NFC reader 160.

In step 320, the short-range radio controller determines whether the short-range radio communication is for accessing an embedded element (e.g., embedded NFC element 140) of the electronic device. The embedded element stores information regarding the electronic device. The embedded element is configured to be readable by a reader (e.g., NFC reader 160) external to the electronic device. The short-range radio controller can determine whether the short-range radio communication is for accessing the embedded element based on one or more of: an identifier of the source of the short-range radio communication, information requested by the short-range radio communication, or a code (e.g., a password) within the short-range radio communication. The short-range radio controller can store identifier(s) of source(s) of short-range radio communications that are for accessing the embedded element locally at the short-range radio controller or within a memory unit accessible to the short-range radio controller. In some examples, the identifiers are hard-wired in the short-range radio controller. In some examples, step 320 is executed upon a requirement (e.g., the short-range radio controller being connected to a power source which also powers a processor of the electronic device) being met. If the requirement is not met, the short-range radio communication is routed directly to the embedded element, as set forth in step 330, described below.

If the short-range radio communication is for accessing the embedded element, the process 300 continues to step 330. If the short-range radio communication is not for accessing the embedded element, the process 300 continues to step 340.

In step 330, the short-range radio controller routes the short-range radio communication to the embedded element. The short-range radio controller can route the short-range radio communication to the embedded element via a wired connection. Alternatively, the embedded element can include an antenna and the short-range radio controller can route the short-range radio communication to the embedded element via a wireless connection. After step 330, the process 300 ends.

In step 340, the short-range radio controller determines whether the short-range radio communication is for an application (e.g., a software application on the electronic device) requiring a security function. The short-range radio controller can determine whether the short-range radio communication is for the application requiring the security function based on information within a message transmitted through the short-range radio controller in the radio communication. The information within the message can reside within the header or the payload of the message. For example, a payment application, which may require the transfer of credit card or other financial or personal information, may require a security function. An application that displays a publically accessible webpage may not require a security function. If the short-range radio application is for an application requiring a security function, the process 300 continues to step 350. If the short-range radio application is not for an application requiring a security function, the process 300 continues to step 360.

In step 350, the short-range radio controller routes the short-range radio communication to a secure element (e.g., secure element 120) of the electronic device. The short-range radio communication can be routed to the secure element using a wired or wireless connection. The secure element is configured to securely communicate with processing hardware (e.g., application processor 110) of the electronic device. The processing hardware is configured to control operation of the electronic device and to execute software application(s) on the electronic device. After step 350, the process 300 ends.

In step 360, the short-range radio controller routes the short-range radio communication to the processing hardware of the electronic device. The short-range radio communication can be routed to the processing hardware using a wired or wireless connection. The processing hardware then processes the short-range radio communication. The short-range radio communication can be processed based on instructions in a software application. After step 360, the process 300 ends.

One order of performing the steps 310-360 of the process 300 is described above. However, the steps 310-360 can be performed in any order. For example, steps 320 and 340, and the steps dependent there from, can be swapped in position. As described above, the steps 310-360 are carried out in series. However, in some implementations, two or more of the steps 310-360 can be carried out in parallel.

The subject technology, in some implementations, relates to storing and retrieving electronic device information. For example, identification information (e.g., a serial number) or water damage information of the mobile device. The subject technology, in some implementations, is directed to storing information about an electronic device in a form that is accessible when the electronic device is powered off or when the primary battery of the electronic device is disabled. Examples of information that can be stored include a device identifier, a battery identifier, device certification information, device quality information, or device usage history information (e.g., whether the device was exposed to water or extreme temperatures, as well as a time and geographic location (e.g., determined based on global positioning system information), if available, where the exposure took place). In addition, information about user interaction with the device (e.g., which software program(s) were running) when the damage occurred can be stored.

As shown by the above discussion, functions relating to storing and retrieving electronic device information may be implemented on computers connected for data communication via the components of a packet data network. Although special purpose devices may be used, such devices also may be implemented using one or more hardware platforms intended to represent a general class of data processing device commonly used to run programming so as to implement the functions discussed above.

As known in the data storage and retrieval field, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the content media editing. The software code is executable by the general-purpose computer that functions as the electronic device 110. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for allowing the user to edit media content to an acceptable size for successful transmission over the network, in essentially the manner performed in the implementations discussed and illustrated herein.

Figures 4, 5:
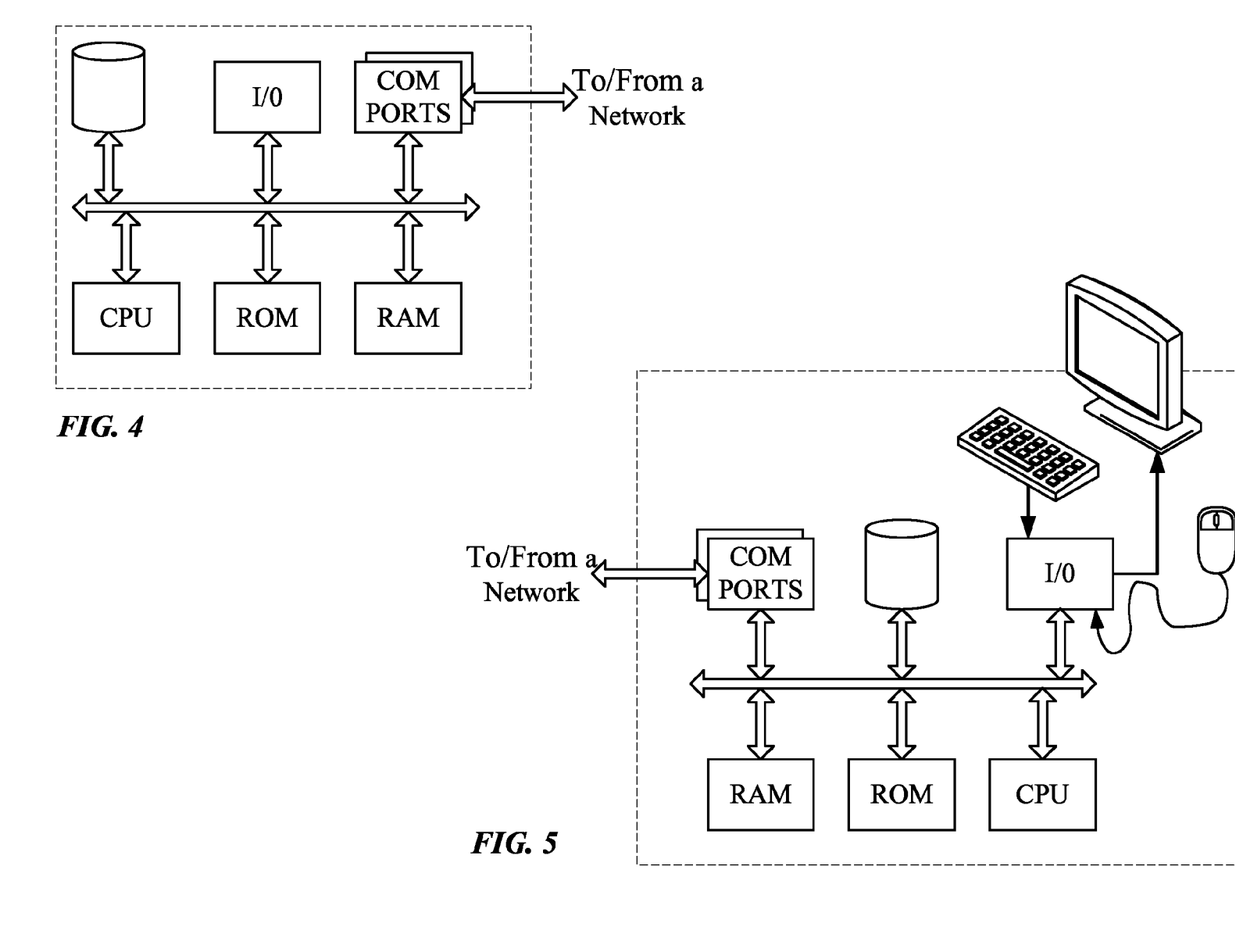
FIG. 4 is a simplified functional block diagram of an example computer that may be configured to function as the electronic device in the system of FIGS. 1-2.
FIG. 5 is a simplified functional block diagram of an example personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of routing short-range radio communications outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic device, comprising:
    a processor configured to control operation of the electronic device;
    a memory storing one or more software applications executable by the processor;
    a short-range radio antenna;
    an embedded element storing information regarding the electronic device, wherein the embedded element is configured to be readable by a reader external to the electronic device;
    a short-range radio controller coupled with the short-range radio antenna, the short-range radio controller configured to:
        receive a short-range radio communication;
        in a case where the short-range radio controller is being powered by a primary battery that is configured to power the processor:
            determine whether the short-range radio communication is for accessing the embedded element;
            route the short-range radio communication to the embedded element in response to determining that the short-range radio communication is for accessing the embedded element; and
            route the short-range radio communication to a component of the electronic device different from the embedded element in response to determining that the short-range radio communication is not for accessing the embedded element; and
        in a case where the short-range radio controller is not being powered by the primary battery:
            route the short-range radio communication to the embedded element;
    wherein the embedded element is powered by a NFC battery different from the primary battery, and wherein the short-range radio controller is powered by the NFC battery in the case where the short-range radio controller is not being powered by the primary battery.

2. The electronic device of claim 1, wherein the short-range radio antenna comprises a near field communication (NFC) antenna, and wherein the short-range radio controller comprises a NFC controller.

3. The electronic device of claim 1, wherein, in response to determining that the short-range radio controller is not being powered by the primary battery, the embedded element is configured to function as a NFC tag.

4. The electronic device of claim 1, wherein the short-range radio controller is further configured to:
    determine whether the short-range radio controller is being powered by the primary battery or the NFC battery.

5. The electronic device of claim 1, further comprising:
    a secure element configured to securely communicate with the processor;
    wherein the short-range radio controller is configured to, in response to determining that the short-range radio controller is being powered by the primary battery and in response to determining that the short-range radio communication is not for accessing the embedded element:
        determine whether the short-range radio communication is for an application requiring a security function;
        route the short-range radio communication to the secure element in response to determining that the short-range radio communication is for the application requiring the security function; and
        route the short-range radio communication to the processor in response to determining that the short-range radio communication is not for the application requiring the security function.

6. The electronic device of claim 5, wherein the secure element comprises the embedded element.

7. The electronic device of claim 5, wherein the embedded element is separate and distinct from the secure element.

8. The electronic device of claim 1, wherein the short-range radio controller is further configured to, in the case where the short-range radio controller is not being powered by the primary battery, route the short-range radio communication to the embedded element without determining whether the short-range radio communication is for accessing the embedded element.

9. The electronic device of claim 1, wherein the embedded element comprises a write-once memory and a read-write memory, wherein the write-once memory stores an identifier for the electronic device or an identifier for the primary battery, and wherein the read-write memory stores information related to usage or failure of the electronic device.

10. The electronic device of claim 9, further comprising:
    a water detector configured to detect a presence of water in a position in the electronic device;
    wherein the write-once memory initially stores an indication of a lack of water damage of the electronic device; and
    wherein the water detector is configured to:
        signal the processor to write, to the write-once memory, of an indication of a presence of water damage of the electronic device upon detecting the presence of water in the position in the electronic device.

11. The electronic device of claim 10, further comprising:
    a network interface;
    wherein the water detector is configured to:
        signal the processor to transmit, via the network interface, an indication that the electronic device is water damaged upon detecting the presence of water in the position in the electronic device.

12. The electronic device of claim 10, wherein the water detector is one of a plurality of water detectors, wherein each of the plurality of water detectors is configured to detect a presence of water in a corresponding position in the electronic device.

13. A method comprising:
    receiving, at a short-range radio controller of an electronic device, a short-range radio communication;
    determining, at the short-range radio controller, whether the short-range radio communication is for accessing an embedded element of the electronic device, wherein the embedded element stores information regarding the electronic device, and wherein the embedded element is configured to be readable by a reader external to the electronic device;
    in response to determining that the short-range radio communication is for accessing the embedded element:

routing the short-range radio communication to the embedded element; and in response to determining that the short-range radio communication is not for accessing the embedded element:

determining whether the short-range radio communication is for an application requiring a security function;

routing the short-range radio communication to a secure element of the electronic device in response to determining that the short-range radio communication is for the application requiring the security function, wherein the secure element is configured to securely communicate with a processor of the electronic device; and routing the short-range radio communication to the processor of the electronic device in response to determining that the short-range radio communication is not for the application requiring the security function, wherein the processor is configured to control operation of the electronic device.

14. The method of claim 13, wherein determining whether the short-range radio communication is for accessing the embedded element of the electronic device comprises:

determining, based on an identifier of a source of the short-range radio communication, whether the short-range radio communication is for accessing the embedded element.

15. The method of claim 13, wherein determining whether the short-range radio communication is for accessing the embedded element of the electronic device comprises:

determining, based on information requested by the short-range radio communication, whether the short-range radio communication is for accessing the embedded element.

16. The method of claim 13, wherein determining whether the short-range radio communication is for accessing the embedded element of the electronic device comprises:

determining, based on a code within the short-range radio communication, whether the short-range radio communication is for accessing the embedded element.

17. The method of claim 13, wherein receiving the short-range radio communication comprises:

receiving a message using near field communication (NFC) technology.

18. A mobile device, comprising:

a wireless transceiver configured to enable wireless data communication via a network;

a least one interface element configured to provide a user interface to provide an output to a user of the mobile device and to receive an input from the user;

a host processor configured to control operations of the mobile device;

an embedded near filed communication (NFC) element storing information regarding the mobile device configured to be readable via an NFC tag reading operation;

a security element (SE) containing information for at least some near field communication;

a near field communication (NFC) antenna; and an NFC controller configured to implement a contactless front end, the NFC controller being coupled to the NFC antenna, the host processor, the embedded NFC element and the SE, wherein the contactless front end of the NFC controller is configured to:

(i) route a near field communication for an application not requiring a security function between the NFC antenna and the host processor;

(ii) route a near field communication requiring a security function between the NFC antenna and the SE; and (iii) route a near field communication for reading the NFC tag readable information regarding the mobile device between the NFC antenna and the embedded NFC element.

19. The mobile device of claim 18, wherein the embedded NFC element is configured to obtain power via the NFC antenna and output the NFC tag readable information via the NFC antenna when the mobile device is in an unpowered state.

* * * * *